Patented May 17, 1938

2,117,720

UNITED STATES PATENT OFFICE 2,117,720

KETONE-NITRILE CONDENSATION PRODUCTS

Heinrich Hopff and Gustav Steinbrunn, Ludwigshafen-on-the-Rhine, Germany, assignors to General Aniline Works, Inc., New York, N. Y., a corporation of Delaware No Drawing. Application November 6, 1936, Serial No. 109,541. In Germany November 12, 1935

14 Claims. (Cl. 260—61)

The present invention relates to new dyestuffs and a process for producing them.

We have found that very valuable dyestuffs are obtained by heating compounds which contain cyano groups on each of two adjacent carbon atoms, or compounds which yield dicyano compounds of the said kind under the reaction conditions, with compounds containing ketonic groups in the presence of condensing agents.

As initial materials of the said kind may be mentioned for example nitriles of aliphatic 1,2-dicarboxylic acids, as for example succinic acid dinitrile, maleic acid dinitrile and dimethyl- and diphenyl-succinic acid dinitriles and also nitriles of aromatic ortho-dicarboxylic acids, as for example phthalic acid dinitrile and the nitriles of naphthalene-ortho-dicarboxylic acids and the derivatives of the said nitriles.

As compounds which yield the said cyano compounds under the reaction conditions may be mentioned for example the amides of the corresponding ortho-dicarboxylic acids. There may also be employed mixtures of the corresponding ortho- or 1,2-dichlor- or ortho-chlorcyano- or 1,2-chlorcyano-compounds with copper cyanides.

The ketonic compounds suitable for the reaction may be of a great variety of kinds. For example acetophenone, benzoin, anthraquinone and its derivatives, benzanthrone, fluorenone, isatin or other more or less high-molecular ketone compounds may be used in which the ketonic groups may be present either in an open chain or in cyclic combination.

Suitable condensing agents are for example compounds such as are used for reactions according to Friedel-Crafts, as for example anhydrous aluminium halides, anhydrous iron chloride, zinc chloride and antimony pentachloride, copper halides and boron fluoride. Since the condensing agent frequently enters into the dyestuff, it is preferably used in an amount greater than the molecular amount. Mixtures of the said condensing agents are equally useful.

The reaction is preferably carried out by heating a mixture of the dicyano compound, the ketonic compound and the condensing agent for some time to fusion. In the case of very vigorous reactions, a melt is first prepared from the dicyano compound and the ketonic compound, the condensing agent being added to the melt in small batches. It is also frequently preferable to add solid or liquid diluents. For example aromatic hydrocarbons or their derivatives, in particular their nitro and halogen compounds, and also amines of high boiling point, such as pyridine, quinoline and piperidine may be used for the purpose. Suitable solid diluents are especially those which yield mixtures of low melting point with the condensing agents, as for example alkali or alkaline earth metal halides, alkali metal sulphates or alkali metal phosphates.

Generally speaking the progress of the reaction may be detected by the increasing viscosity of the melt. The reaction temperature may be varied as desired within wide limits; it depends on the nature of the condensing agent and the nature of the initial material. In order to obtain a smooth reaction, the whole is preferably heated for a such a period and at such a temperature that a uniform melt is formed. The reaction mixture may then be worked up by decomposing the melt with water or ice and removing any water-insoluble diluent used by filtration or by treatment with steam.

The dyestuffs thus obtainable may be brought into paste form in known manner or converted into dry powders. By treatment with sulphonating agents they may for the most part be converted into sulphonic acids. These may frequently be laked very well. Finally they may also be used as pigment dyestuffs for wallpapers and coatings and for other purposes and, in so far as they contain vattable groups, also as vat dyestuffs.

The following examples will further illustrate how our said invention may be carried out in practice but the invention is not restricted to these examples. The parts are by weight.

*Example 1*

A mixture of 115 parts of benzanthrone, 134 parts of anhydrous aluminium chloride and 64 parts of phthalic acid dinitrile is heated at 130° C. while stirring. As soon as the reaction, which at first is vigorous, has become milder, the melt is slowly further heated to 200° C. and kept at this temperature for 3 hours. After cooling, the melt is decomposed with ice. The vivid green colored residue is filtered off by suction and washed with water. 220 parts of the dyestuff are thus obtained. It has an extremely good fastness to light.

The shades of color of the dyestuffs obtained by using various compounds containing ketonic groups may be seen from the following list:—

| Ketonic compound | Shade of color of the dyestuff |
|---|---|
| Benzanthrone | Blue-green. |
| Fluorenone | Greenish blue. |
| 1-chloranthraquinone | Grey-blue. |
| Bz, 1-nitrobenzanthrone | Olive. |
| Benzoin | Olive. |
| Bz, 1-aminobenzanthrone | Dark olive. |
| 6-aminobenzanthrone | Dark olive. |
| Bz, 1, 6-dinitrobenzanthrone | Brown-violet. |
| Michler's ketone | Dark green. |
| Benzophenone | King's blue. |
| Anthraquinone | Dark grey. |
| 1-aminoanthraquinone | Black-blue. |
| Benzil | Dark olive. |
| 2-hydroxyanthraquinone | Olive. |
| Isatin | Black-brown. |
| Quinone | Olive-green. |
| Naphthoquinone | Olive-green. |
| Phenanthrenequinone | Grey. |
| Chloranil | Grey-green. |
| 6-chlorbenzanthrone | Yellow-green. |
| 1, 4-diaminoanthraquinone | Brown-violet. |

*Example 2*

A mixture of 84 parts of benzanthrone, 47 parts of phthalodinitrile and 130 parts of anhydrous ferric chloride is heated for 2 hours at from 230° to 250° C. After cooling, the melt is decomposed by adding ice. The resulting olive-green dyestuff is filtered off, washed and dried.

*Example 3*

A mixture of 63 parts of benzanthrone, 35 parts of phthalodinitrile and 100 parts of anhydrous zinc chloride is heated for 2 hours at from 230° to 250° C. The melt is then worked up as described above and the resulting blue-green dyestuff is filtered off by suction, washed and dried.

*Example 4*

A mixture of 115 parts of benzanthrone, 64 parts of phthalodinitrile, 80 parts of trichlorbenzene and 270 parts of anhydrous aluminium chloride is heated for 2 hours at about 220° C. After cooling, the melt is decomposed by the addition of ice, the trichlorbenzene is removed by means of steam and the resulting green dyestuff isolated in the usual manner.

What we claim is:—

1. A process for producing dyestuffs which comprises heating a compound containing a cyano group on each of 2 adjacent carbon atoms with a cyclic compound containing at least 1 ketonic group in the presence of a condensing agent of the Friedel-Crafts-type.

2. A process for producing dyestuffs which comprises heating a compound containing a cyano group on each of 2 adjacent carbon atoms with a cyclic compound containing at least 1 ketonic group, in the presence of anhydrous aluminium chloride.

3. A process for producing dyestuffs which comprises heating a phthalodinitrile with a cyclic compound containing at least 1 ketonic group, in the presence of a condensing agent of the Friedel-Crafts-type.

4. A process for producing dyestuffs which comprises heating a phthalodinitrile with a cyclic compound containing at least 1 ketonic group in the presence of anhydrous aluminium chloride.

5. A process for producing dyestuffs which comprises heating a phthalodinitrile with a cyclic compound containing at least 1 ketonic group in the presence of anhydrous aluminium chloride and in the presence of a diluent.

6. A process for producing dyestuffs which comprises heating a compound containing a cyano group on each of 2 adjacent carbon atoms with a compound containing at least 1 cyclic bound keto group, in the presence of a condensing agent of the Friedel-Crafts-type.

7. The process for producing a dyestuff which comprises heating 6-chlorbenzanthrone with phthalodinitrile in the presence of anhydrous aluminium chloride.

8. Dyestuffs which can be obtained by heating a compound containing a cyano group on each of 2 adjacent carbon atoms with a cyclic compound containing at least 1 ketonic group in the presence of a condensing agent of the Friedel-Crafts-type.

9. Dyestuffs which can be obtained by heating a compound containing a cyano group on each of 2 adjacent carbon atoms with a cyclic compound containing at least 1 ketonic group in the presence of anhydrous aluminium chloride.

10. Dyestuffs which can be obtained by heating a phthalodinitrile with a cyclic compound containing at least 1 ketonic group in the presence of a condensing agent of the Friedel-Crafts-type.

11. Dyestuffs which can be obtained by heating a phthalodinitrile with a cyclic compound containing at least 1 ketonic group in the presence of anhydrous aluminium chloride.

12. Dyestuffs which can be obtained by heating a compound containing a cyano group on each of two adjacent carbon atoms with a compound containing at least one cyclo-ketonic group in the presence of a condensing agent of the Friedel-Crafts-type.

13. The green pigment dyestuff which can be obtained by heating phthalodinitrile with benzanthrone in the presence of anhydrous aluminium chloride at about 200° C.

14. The green pigment dyestuff which can be obtained by heating phthalodinitrile with 6-chlorbenzanthrone in the presence of anhydrous aluminium chloride at about 200° C.

HEINRICH HOPFF.
GUSTAV STEINBRUNN.